United States Patent
Cobb et al.

(10) Patent No.: US 9,651,358 B2
(45) Date of Patent: May 16, 2017

(54) GRAZING-INCIDENCE INTERFEROMETER WITH DUAL-SIDE MEASUREMENT CAPABILITY USING A COMMON IMAGE PLANE

(71) Applicant: Corning Incorporated, Corning, NY (US)

(72) Inventors: Joshua Monroe Cobb, Victor, NY (US); Thomas James Dunn, Penfield, NY (US); John Weston Frankovich, Fairport, NY (US)

(73) Assignee: Corning Incorporated, Corning, NY (US)

( * ) Notice: Subject to any disclaimer, the term of this patent is extended or adjusted under 35 U.S.C. 154(b) by 315 days.

(21) Appl. No.: 14/445,210

(22) Filed: Jul. 29, 2014

(65) Prior Publication Data

US 2015/0049337 A1    Feb. 19, 2015

Related U.S. Application Data

(60) Provisional application No. 61/867,223, filed on Aug. 19, 2013.

(51) Int. Cl.
*G01B 9/02* (2006.01)
*G01B 11/06* (2006.01)

(52) U.S. Cl.
CPC ..... *G01B 9/02022* (2013.01); *G01B 9/02021* (2013.01); *G01B 9/02027* (2013.01);
(Continued)

(58) Field of Classification Search
CPC ............ G01B 9/02022; G01B 9/02072; G01B 9/02021; G01B 9/02027; G01B 9/02041; G01B 2290/30; G01B 11/06
See application file for complete search history.

(56) References Cited

U.S. PATENT DOCUMENTS

| 5,654,798 A | 8/1997 | Bruning |
| 5,777,738 A | 7/1998 | Kulawiec |
| 6,249,351 B1 | 6/2001 | De Groot |

FOREIGN PATENT DOCUMENTS

DE    10014161    9/2001

OTHER PUBLICATIONS

Peter de Groot, "Diffractive grazing-incidence interferometer", Applied Optics vol. 39, No. 10, Apr. 1, 2000.
(Continued)

*Primary Examiner* — Hwa Lee
(74) *Attorney, Agent, or Firm* — Kevin L. Bray (57) ABSTRACT

A grazing-incidence interferometer includes first and second spaced-apart diffractive optical elements with a generally planar object disposed therebetween. The first diffractive optical element forms sheared first-diffracted-order light beams that reflect from opposite first and second surfaces of the object at grazing-incidence angles, while a zero-diffracted-order light beam goes unreflected. The second diffractive optical element combines the unreflected zero-diffracted-order light beam and the sheared reflected beams to form a collimated, combined beam. A 1× double-telecentric relay system relays the combined beam to a folding optical system that forms first and second interference images on a diffusing screen located at an image plane. Digital images of the first and second interference images are obtained and processed to characterize the thickness variation of the object.

15 Claims, 12 Drawing Sheets

(52) U.S. Cl.
CPC ..... *G01B 9/02041* (2013.01); *G01B 9/02072* (2013.04); *G01B 11/06* (2013.01); *G01B 2290/30* (2013.01)

(56) References Cited

OTHER PUBLICATIONS

Andrew W. Kulawiec et al., A Portable Grazing Incidence Interferometer for Measuring the Flatness of Slideways and Surface Plates, American Society for Precision Engineering (ASPE) Proceedings, Nov. 3, 1999.

Jessica Schneider et al: "Compensation for Anamcrphotic Distortion in Grazing-Incidence Interferometry Testing Planar Specimens", Applied Optics. vol. 42., No. 22, Jan. 1, 2003 (Jan. 1, 2003). p. 4480.

Schwider J: "Sharp and rectified imaging of plane test objects in diffractive grazing incidence interferometers", Applied Optics, Optical Society of America. Washington. DC; US. vol. 53. No. 5., Feb. 10, 2014 (Feb. 10, 2014). pp. 988-1000.

DE 10014161 A1—machine translation.

GRAZING-INCIDENCE INTERFEROMETER WITH DUAL-SIDE MEASUREMENT CAPABILITY USING A COMMON IMAGE PLANE

This application claims the benefit of priority under 35 U.S.C. §119 of U.S. Provisional Application Ser. No. 61/867,223 filed on Aug. 19, 2013 the content of which is relied upon and incorporated herein by reference in its entirety.

FIELD

The present disclosure relates to grazing-incidence interferometers and in particular relates to grazing-incidence interferometers with dual-side measurement capability.

The entire disclosure of any publication or patent document mentioned herein is incorporated by reference.

BACKGROUND

Interferometry is the process of measuring interference fringe patterns between an object beam and a reference beam. The comparison of these two beams allows for a very accurate measurement of an object beam that has been deformed by some surface or object.

Grazing-incidence interferometers employ an object beam that reflects from the object at a high-incidence angle. Such interferometers can be very useful because most surfaces have a very strong specular reflection as the incidence angle approaches 90 degrees. This allows for the interferometric measurement of surfaces that are not polished, such as the back side of a silicon wafer.

A shortcoming of prior-art grazing-incidence interferometers, such as disclosed in U.S. Pat. No. 6,239,351, is that they require a reference surface from which a reference beam must reflect. The reference surface needs to be parallel to and in close proximity to the object. This makes measuring the opposite surfaces of a generally planar object problematic. In addition, the zero-diffracted-order light beam is not employed and so needs to be suppressed.

SUMMARY

An aspect of the disclosure is a grazing-incidence interferometer for analyzing a surface of an object, comprising: a first diffractive optical element (DOE) arranged to receive a substantially coherent light beam and form therefrom a zero-diffracted-order light beam and a first-diffracted-order light beam, wherein the first-diffracted-order light beam reflects from the object surface at a grazing-incidence angle, while the zero-diffracted-order light beam is unreflected; a second DOE arranged to receive and combine the unreflected zero-diffracted-order light beam and the reflected first-diffracted-order light beam to form a combined light beam that is substantially collimated; a 1× double-telecentric relay system having an optical axis co-axial with the combined light beam and an aperture stop sized to transmit or reflect only the combined beam; and a screen tilted substantially at the grazing-incidence angle.

Another aspect of the disclosure is a grazing-incidence interferometer for analyzing opposite first and second surfaces of a generally planar object. The interferometer includes: a light source that generates a substantially coherent light beam; first and second spaced-apart diffractive optical elements arranged along an optical axis and downstream of the light source, with the object therebetween, wherein the first diffractive optical element forms $-1^{st}$, zero and $+1^{st}$ diffracted-order light beams, with the $-1$ and $+1$ diffracted-order light beams respectively reflecting from the first and second surfaces and combining with the zero-diffracted-order light beam in a sheared manner to form a substantially collimated combined beam; a 1× double-telecentric relay system downstream of the second diffractive optical element and having a transmitting or reflecting aperture stop that transmits or reflects only the collimated combined beam; and a folding optical system downstream of the 1× double-telecentric relay system and that forms first and second interference images at an image plane.

Another aspect of the disclosure is a method of performing grazing-incidence interferometry of an object having at least one object surface. The method includes: forming from a substantially coherent wavefront a zero-diffracted-order light beam and a first-diffracted-order light beam; reflecting the first-diffracted-order light beam from the at least one object surface while leaving the zero-diffracted-order light beam unreflected; combining the reflected first-diffracted-order light beam with the unreflected zero-diffracted-order light beam in a sheared manner to form a combined beam that is substantially collimated; relaying the collimated combined beam through a 1× double-telecentric relay having an aperture stop that passes or reflects substantially only the combined beam; and forming from the relayed collimated combined beam at least one interference image of the object surface.

Additional features and advantages will be set forth in the Detailed Description that follows and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework for understanding the nature and character of the claims.

BRIEF DESCRIPTION OF THE DRAWINGS

The accompanying drawings are included to provide a further understanding and are incorporated into and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

Cartesian coordinates are shown in some of the Figures for the sake of reference and are not intended to be limiting as to direction or orientation.

In the description below, the term "first order" or "first diffracted order" refers to either the −1 or +1 diffracted order, while the term "first orders" or "first diffracted orders" refers to both the −1 and +1 diffracted orders. Also, while the term "zero diffracted order" or "zero order" refers to the straight-through undiffracted portion of the light, this portion of the light is nevertheless referred to as a "diffracted order" to follow its common use in the art and to maintain consistency of terminology.

Figure 1:
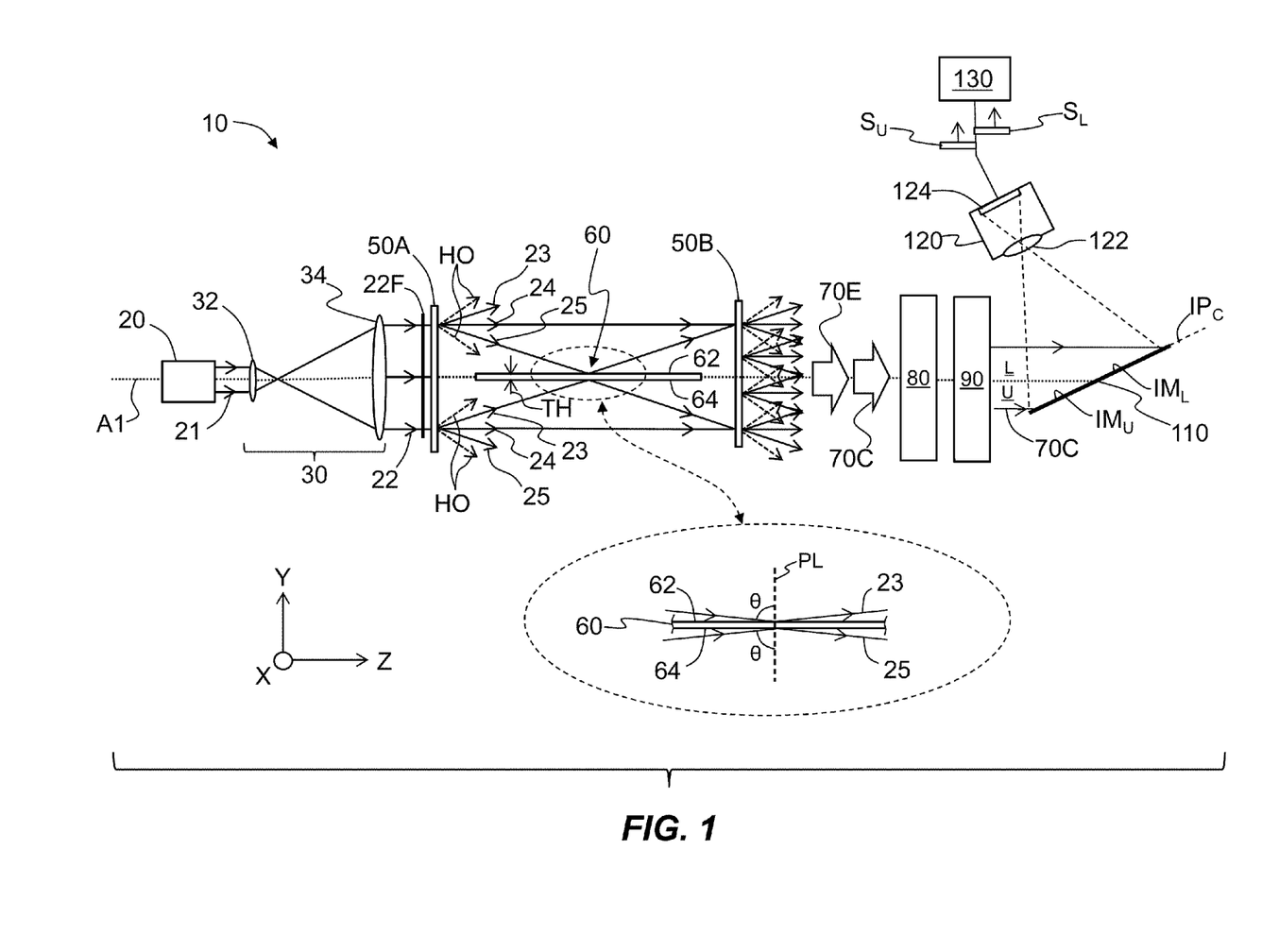
FIG. 1 is an optical diagram of an exemplary embodiment of a grazing-incidence interferometer according to the disclosure.

FIG. 1 is an optical diagram of an exemplary embodiment of a grazing-incidence interferometer ("interferometer") 10 according to the disclosure. The interferometer 10 includes, along an axis A1, a light source 20 that emits a substantially coherent initial light beam 21. An exemplary light source 20 is a laser, such as a laser diode, semiconductor laser, gas laser, solid-state laser, etc. The interferometer 10 also includes a beam-expansion optical system 30 shown as comprising lenses 32 and 34 configured to receive initial light beam 21 from light source 20 and form an expanded and collimated light beam 22 having substantially planar wavefronts 22F.

The interferometer 10 also includes a first diffractive optical element (DOE) 50A arranged along optical axis A1 to receive collimated light beam 22 and form therefrom light beams 23, 24 and 25 associated, respectively, with the −1, 0 and +1 diffracted orders, along with higher diffracted orders (dashed-line arrows) collectively denoted HO. A generally planar object 60 to be measured resides in the X-Z plane along optical axis A1 adjacent and downstream of DOE 50A.

The object 60 has an upper surface (i.e., an upper side) 62 and an opposite lower surface (i.e., a lower side) 64. The object 60 can be any type of generally planar object in need of characterization, such as a transparent window, a semiconductor wafer, an opaque plate, etc. In an example, object 60 has a nominal thickness TH and also has an unknown thickness variation TH(x,z) that needs to be determined.

In an example, object 60 is supported in a manner that allows for both its upper and lower surfaces 62 and 64 to be illuminated, as described below. Thus, in one example, object 60 is supported at its edges, while in another example the object is supported at lower surface 62 by thin support members 66 (see FIG. 2, introduced and discussed below), such as lift pins. In an example, support members 66 are adapted to move object 60 up and down (i.e., in the +y and −y directions) to effectuate phase-shifting interferometry, as explained in greater detail below.

The $-1^{st}$ and $+1^{st}$ diffracted-order light beams 23 and 25 are incident upon and reflect from upper surface 62 and lower surface 64, respectively, at a grazing-incidence angle θ measured relative to a line PL perpendicular to the upper and lower surfaces (see close-up inset of FIG. 1). The higher-diffracted-order light beams HO are also incident upon and reflect from upper and lower surfaces 62 and 64. In an exemplary embodiment, grazing-incidence angle θ>80 degrees.

The interferometer 10 also includes a second DOE 50B arranged adjacent and downstream of object 60. The second DOE 50B is arranged to receive the reflected $-1^{st}$ and $+1^{st}$ diffracted-order light beams 23 and 25, as well as the non-reflected zero-diffracted-order light beam 24. The second DOE 50B also receives the reflected higher-diffracted-order light beams HO.

Exemplary DOEs for use as DOE 50A and 50B include a phase grating, which can be in the form of a holographic optical element; a binary optic; a computer-generated hologram; a surface-relief diffracted lens; etc. The DOEs 50A and 50B are shown as transmissive elements, but one or both of these elements may be made reflective elements by employing a suitably folded configuration for interferometer 10.

In an alternate embodiment of interferometer 10, only zero-diffracted-order light beam 24 and one of the first-diffracted-order light beams 23 or 25, which respectively reflect from either lower surface 64 or upper surface 62, are employed.

Figure 2:
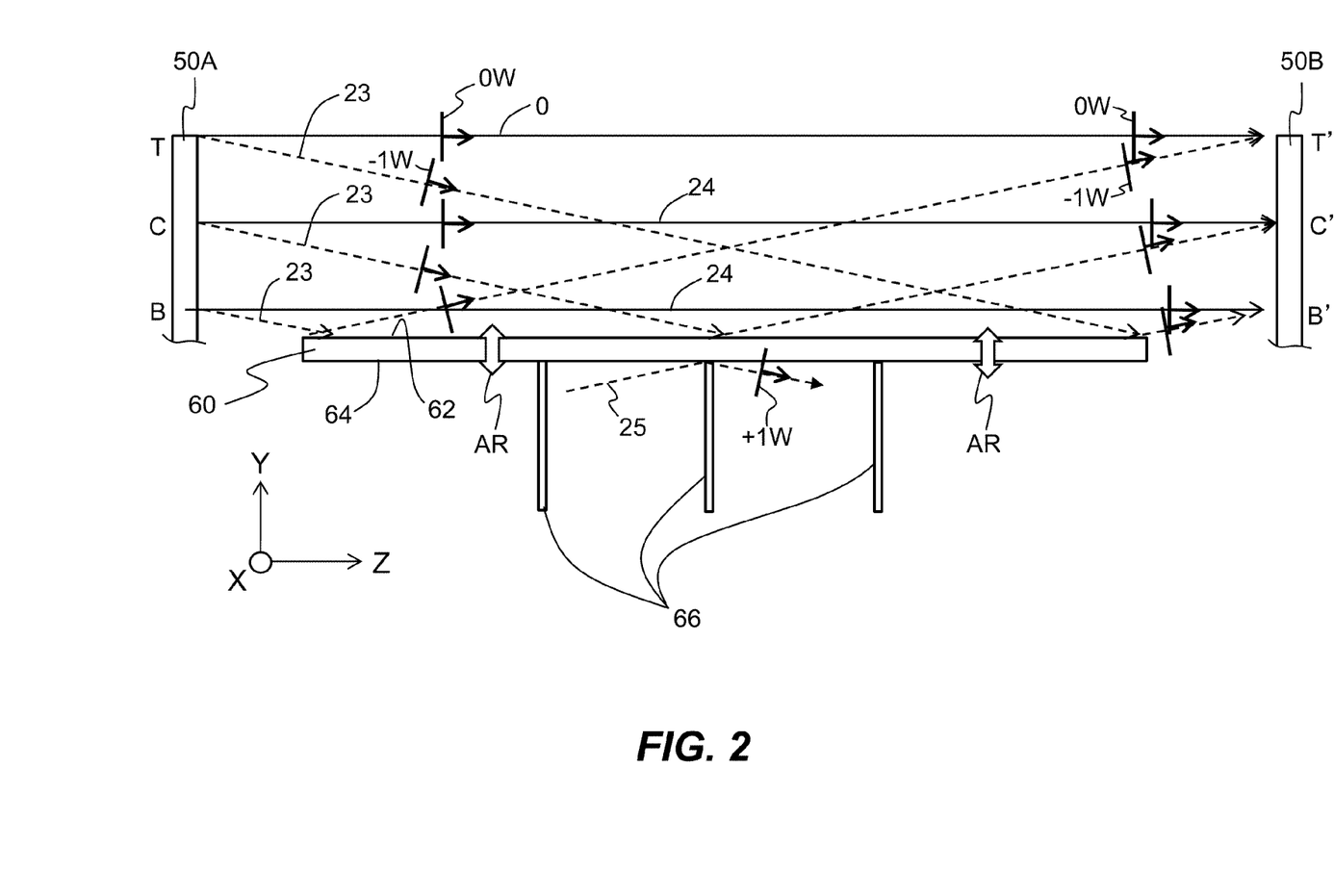
FIGS. 2 through 4 are close-up, partial-cutaway views of first and second diffracted optical elements and an object, and illustrate how the $+1^{st}$ and $-1^{st}$ diffracted-order light beams are sheared relative to the zero-diffracted-order light beam.

FIG. 2 is a close-up, partial-cutaway view of the first and second DOEs 50A and 50B and object 60, and illustrates how $-1^{st}$ and $+1^{st}$ diffracted-order light beams 23 and 25 are sheared relative to zero-diffracted-order light beam 24. The zero-diffracted-order light beam 24 has planar wavefronts 0W while $-1^{st}$ and $+1^{st}$ diffracted-order light beams 23 and 25 have respective planar wavefronts −1W and +1W. At a center point C of first DOE 50A, the incident wavefront 22F is split into $-1^{st}$ diffracted-order light beam 23 and zero-diffracted-order light beam 24. The zero-diffracted-order light beam 24 travels a straight non-reflecting path to a corresponding center point C' at second DOE 50B while $-1^{st}$ diffracted-order light beam 23 reflects from upper surface 62 and then travels to center point C'. This is the only place where $-1^{st}$ diffracted-order and zero-diffracted-order light beams 23 and 24 are not sheared.

Continuing with FIG. 2, at a top position T at first DOE 50A, zero-diffracted-order light beam 24 travels a straight non-reflecting path to a corresponding top position T' at second DOE 50B. On the other hand, $-1^{st}$ diffracted-order light beam 23 that starts at top position T reflects from upper surface 62 and then intersects second DOE 50 B at a bottom position B'. Likewise, $-1^{st}$ diffracted-order light beam 23 that starts at a bottom position B at first DOE 50A reflects from upper surface 62 and then intersects second DOE 50B at top position T'. This shows that the diffracted orders are sheared and then recombined.

This same reasoning applies to the $+1^{st}$ and zero-diffracted-order light beams 25 and 24 relative to lower surface 64 of object 60. Thus, the interfering portions of the reference and the measurement diffracted orders (i.e., reference and measurement wavefronts 0W, −1W and +1W associated with the zero and $-1^{st}$ and $+1^{st}$ diffracted orders) do not generally originate from substantially the same portions of the initial illumination wavefront 22F.

Because the wavefronts 0W, −1W and +1W are sheared, there will be in the interference pattern an error induced by wavefront aberration as the beam exits DOE 50A. This residual system error can be removed from the interference pattern by measuring a perfect reference flat and then removing the part of the interference pattern that deviates from the perfect reference.

Figure 3:
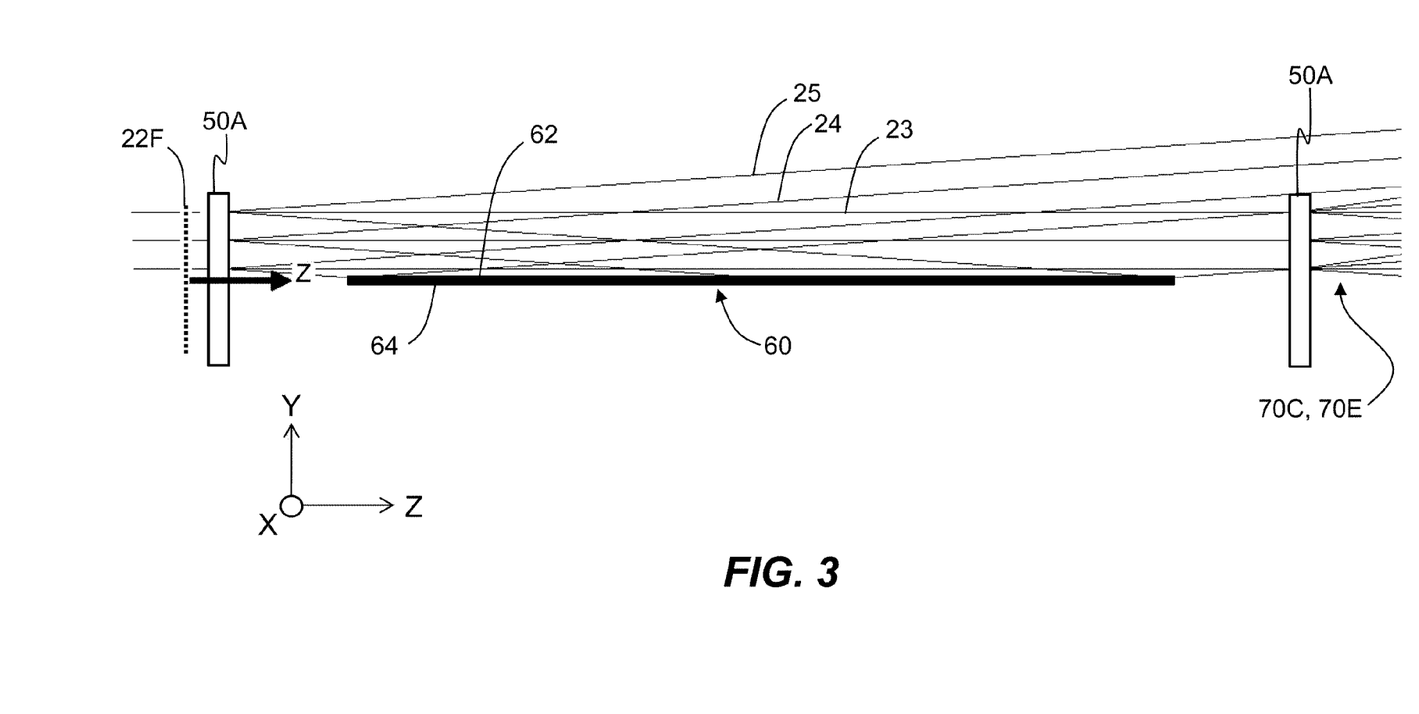

With reference again to FIG. 1 and also to FIG. 3, the portion of second DOE 50B that lies above optical axis A1 receives the combined zero- and $-1^{st}$ diffracted-order light beams 24 and 23, as well as combined higher diffracted orders HO (not shown). Likewise, the portion of second DOE 50B that lies below optical axis A1 receives the combined zero- and $+1^{st}$ diffracted-order light beams 24 and 25, as well as combined higher diffracted orders HO (not shown).

Figure 4:
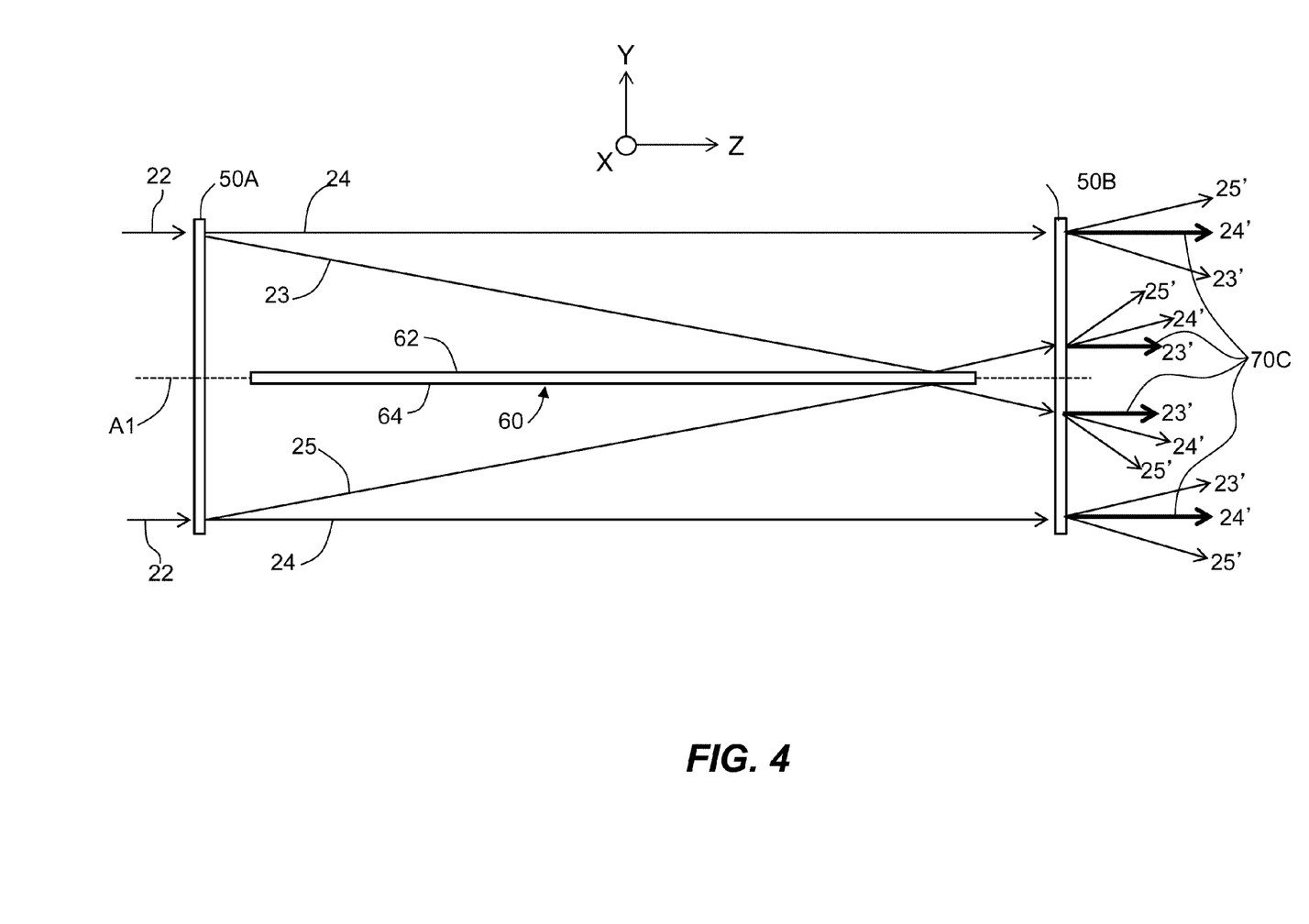

FIG. 4 is similar to FIG. 3 and isolates the zero- and $-1^{st}$ diffracted-order light beams 24 and 23 for the upper surface 62 and the zero- and $+1^{st}$ diffracted-order light beams 24 and 25 for the lower surface 64. The zero-diffracted-order light beam 24 travels a straight, unreflected path to second DOE 50B, which generates secondary diffracted-order light beams 23', 24' and 25'. The $-1^{st}$ diffracted-order light beam 23 reflects from upper surface 62 of object 60 and is then incident upon second DOE 50B, which forms secondary diffracted-order light beams 23', 24' and 25', with $-1^{st}$ diffracted-order light beam 23' being substantially parallel to optical axis A1. Likewise, $+1^{st}$ diffracted-order light beam 25 reflects from lower surface 64 and is then incident upon second DOE 50B, which forms secondary diffracted-order light beams 23', 24' and 25', with +1 secondary diffracted-order light beam 25' being substantially parallel to optical axis A1. The secondary zero-diffracted-order light beam 24' (bold arrow) formed from the original zero-diffracted-order light beam 24 combines with those −1 and +1 diffracted-order light beams 23' and 25' (bold arrows) that are substantially parallel to optical axis A1 to define a combined beam 70C that is substantially collimated. The higher diffracted orders HO (not shown) and extraneous lower orders (e.g., −1 secondary diffracted-order light beam 23' that is not parallel to optical axis A1) also combine at second DOE 50B to form extraneous diffracted-order light beams, which are collectively represented as 70E in FIG. 1.

Figure 5:
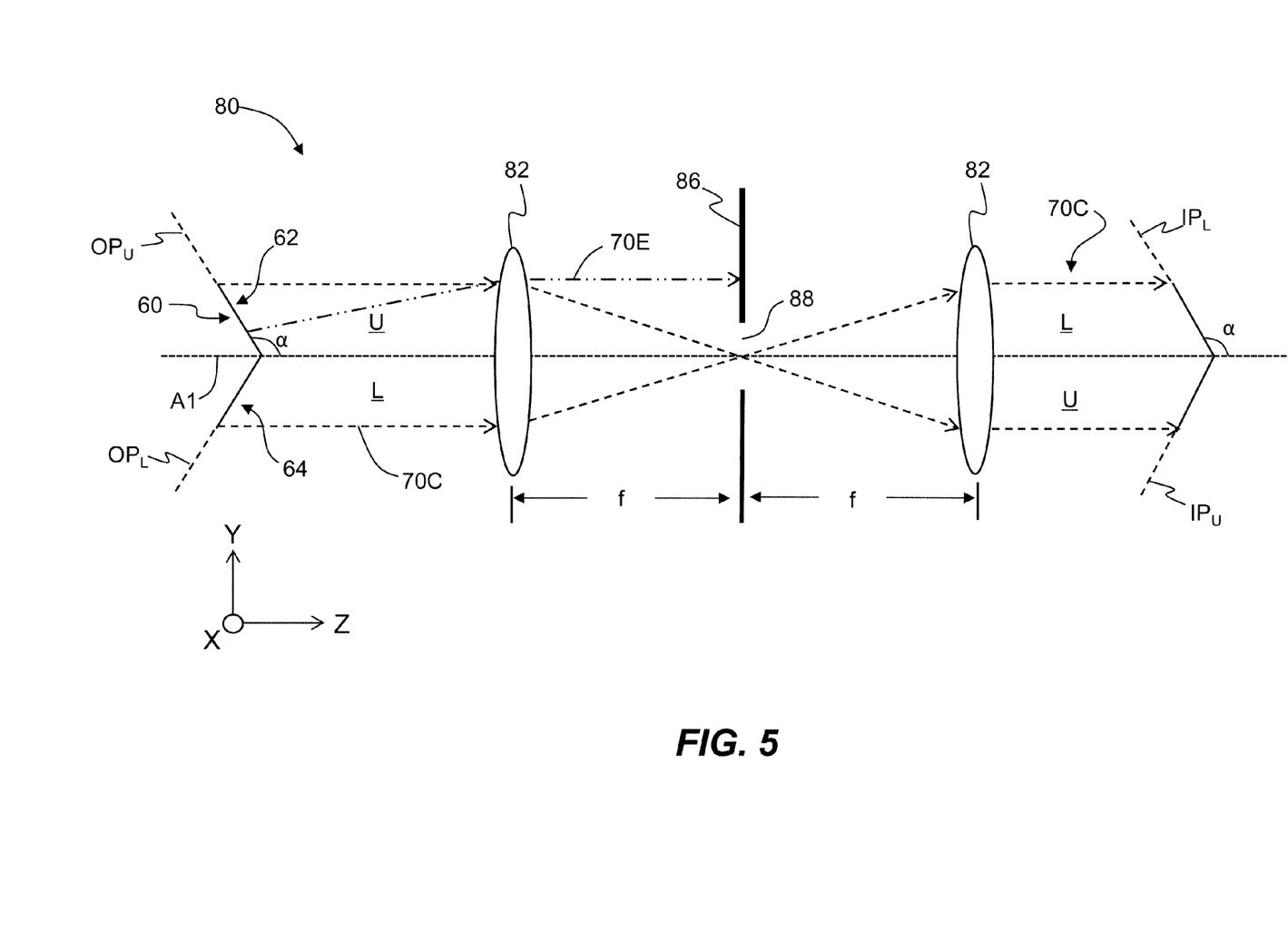
FIG. 5 is an optical diagram of an exemplary embodiment of a 1× double-telecentric relay optical system.

With reference again to FIG. 1, interferometer 10 further includes a 1× double-telecentric relay optical system ("relay optical system") 80 arranged to receive from second DOE 50B combined beam 70C as well as extraneous light beams 70E. FIG. 5 is an optical diagram of an exemplary embodiment of relay optical system 80. The relay optical system 80 includes two spaced-apart lenses 82 between which is disposed an aperture stop 86 having an aperture 88. The lenses 82 each have a focal length f, and aperture stop 86 is located a distance f away from each lens so that the two lenses are separated by a distance 2f. The aperture 88 of aperture stop 86 is sized to pass combined beam 70C while substantially blocking extraneous light beams 70E. The exemplary aperture stop 86 shown in FIG. 5 is referred to herein as a "transmitting" aperture stop because it transmits substantially only combined beam 70C.

The relay optical system 80 relays images for both upper and lower surfaces 62 and 64 of object 60 (or portions thereof, as explained below). In FIG. 5, light associated with upper surface 62 of object 60 is denoted U and light associated with lower surface 64 is denoted L. The relay optical system 80 has two tilted object planes OP (namely, $OP_U$ and $OP_L$) with tilt angles α and two corresponding tilted image planes IP (namely, $IP_U$ and $IP_L$), also with tilt angles α (due to the 1× magnification), wherein the tilts of the object and image planes satisfy the Scheimpflug condition for upper and lower surfaces 62 and 64.

Satisfying the Scheimpflug condition for a 1× double-telecentric configuration provides for an in-focus, distortion-free and coma-free image. The image planes $IP_U$ and $IP_L$ have tilt angles α that are the same as the grazing-incidence angle of the $-1^{st}$ and $+1^{st}$ diffracted-order light beams 23 and 25 relative to upper and lower surfaces 62 and 64 of object 60 (i.e., α=θ).

The effective tilts of upper and lower surfaces 62 and 64 are of the opposite sign so that image planes $IP_U$ and $IP_L$ are tilted in opposite directions. This presents a difficulty in forming images of upper and lower surfaces 62 and 64 in a common image plane $IP_C$ (see FIG. 1), as would be desirable for example when imaging the upper and lower surfaces onto a screen. There is an advantage to having the images of upper and lower surfaces 62 and 64 be in focus at a common image plane $IP_C$ because it allows for the interferograms of each object surface to be subsequently imaged onto a single image sensor. Thus, interferometer 10 additionally includes a folding optical system 90 disposed between relay optical system 80 and common image plane $IP_C$, and which is described in greater detail below.

FIG. 1 shows a diffusing screen 110 arranged in common image plane $IP_C$. An exemplary diffusing screen 110 is substantially Lambertian. A digital camera 120 having an imaging lens 122 and a digital image sensor 124 is arranged to capture a digital image of diffusing screen 110, on which is formed interference images $IM_L$ and $IM_U$ of lower and upper surfaces 64 and 62, respectively, of object 60. Here, the term "interference image" is synonymous with the term "interferogram" and refers to the imaged interference pattern defined by combined beam 70C. The digital image sensor 124 converts interference images $IM_L$ and $IM_U$ into electrical image signals $S_L$ and $S_U$ representative of the interference images. It is noted here that interference images $IM_L$ and $IM_U$ of lower and upper surfaces 64 and 62 may include regions of the lower and upper surfaces, or may include substantially the entirety of the lower and upper surfaces.

A processor 130 is electrically connected to digital image sensor 124 and is configured to receive and process electrical image signals $S_L$ and $S_U$. In an example, processor 130 is provided with instructions embodied in a computer-readable medium that causes the processor to calculate respective upper and lower surface topographies $h_U(x,z)$ and $h_L(x,z)$ for upper and lower surfaces 62 and 64 of object 60 and to further calculate the thickness variation $TH(x,z)=h_U(x,z)-h_L(x,z)$ of the object based on the upper and lower surface topographies.

A common method of increasing the resolution of an interferometer is to incorporate the process of phase-shifting interferometry (also called phase-modulation interferometry). Phase-shifting interferometry described in detail in the book *Optical Shop Testing*, Daniel Malacara, ed., John Wiley and Sons, (2007) Chapter 14, pp. 547-665. A static interferogram has the disadvantage of requiring the data analysis to find the center of a fringe. The resolution of this method is limited because the fringe pattern has a limited number of pixels.

With phase-shifting interferometry, the phase of the reference or object beam is modulated. This modulation not only gives the polarity of the wavefront but also allows for much higher resolution. It is therefore advantageous to incorporate some method for employing phase-shifting interferometry in this grazing-incidence diffraction grating interferometer. One way to do this is to translate object 60 orthogonally to the axis of the diffraction grating, as indicated by the arrows AR in FIG. 2. The amount of translation requires is typically on the order of a few microns or so.

Referring again to FIGS. 1 and 2, when upper surface 62 of object 60 is moved in the Y-direction, the phase of the −1W wavefront that reflects off of this surface will be altered as it recombines with the zero order wavefront 0W. Likewise, at the same time, surface 64 is changing its position, so that the phase of wavefront +1W reflecting off of this surface is also modulated.

Figure 6:
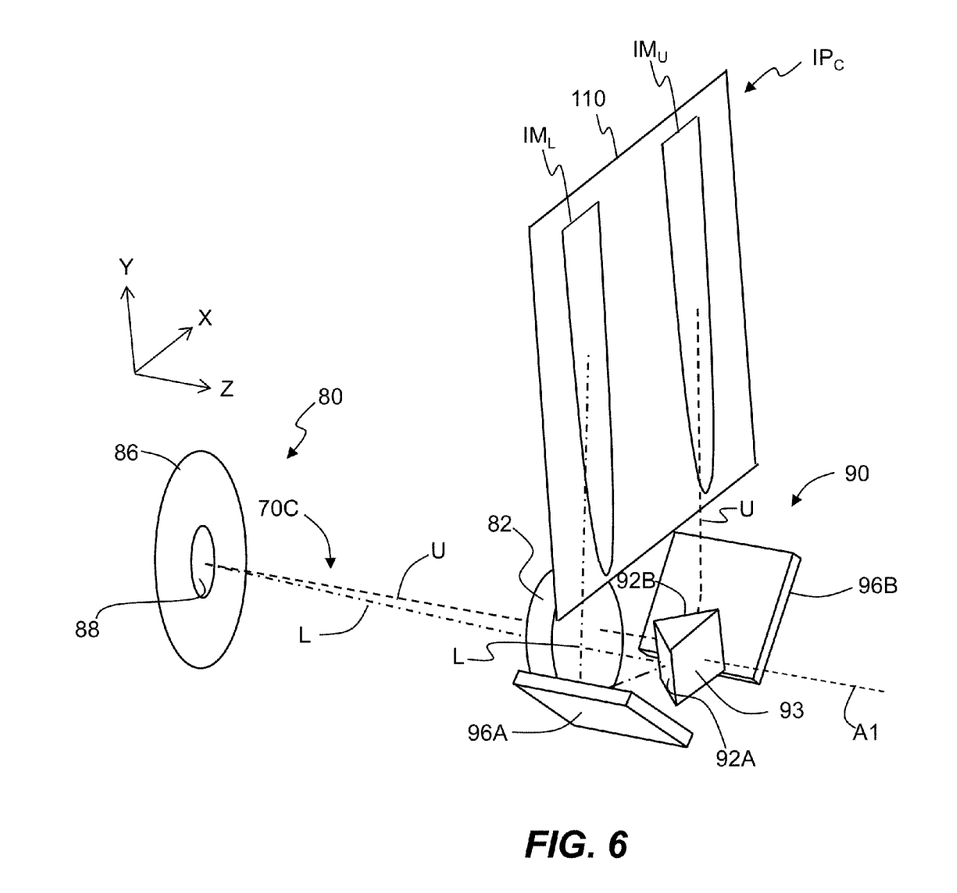
FIG. 6 is a close-up elevated view of an exemplary folding optical system, along with a portion of the relay optical system, illustrating how the two differently oriented image upper and lower planes are combined onto a common image plane.

It is advantageous that upper and lower image planes $IP_U$ and $IP_L$ be made to coincide on common image plane $IP_C$. FIG. 6 is a close-up elevated view of an exemplary folding optical system 90, along with a portion of relay optical system 80. The folding optical system 90 includes, adjacent lens 82, first fold mirrors 92A and 92B shown as part of a right-angle reflecting prism member 93 to minimize the separation of these fold mirrors. Central upper and lower light beams U and L associated with upper and lower surfaces 62 and 64 of object 60 are also shown.

The first fold mirrors 92A and 92B reside in a plane orthogonal to upper and lower surfaces 62 and 64 of object 60 (i.e., orthogonal to the X-Z plane). This configuration serves to reflect respective upper and lower light beams U and L in the +X and −X directions. Second fold mirrors 96A and 96B are arranged to respectively receive upper and lower light beams U and L and fold them so that they travel in the Y-direction. The diffusing screen 110 can then be tilted substantially at the grazing-incidence angle so that both upper and lower interference images $IM_U$ and $IM_L$ appear side-by-side on the screen. Thus, folding optical system 90 can be said to map the upper and lower image planes $IP_U$ and $IP_L$ onto common image plane $IP_C$. In one example, folding optical system 90 consists of four fold mirrors 92A, 92B, 96A and 96B as shown in FIG. 6, while in another example additional optical elements (not shown) are employed.

Figure 7:
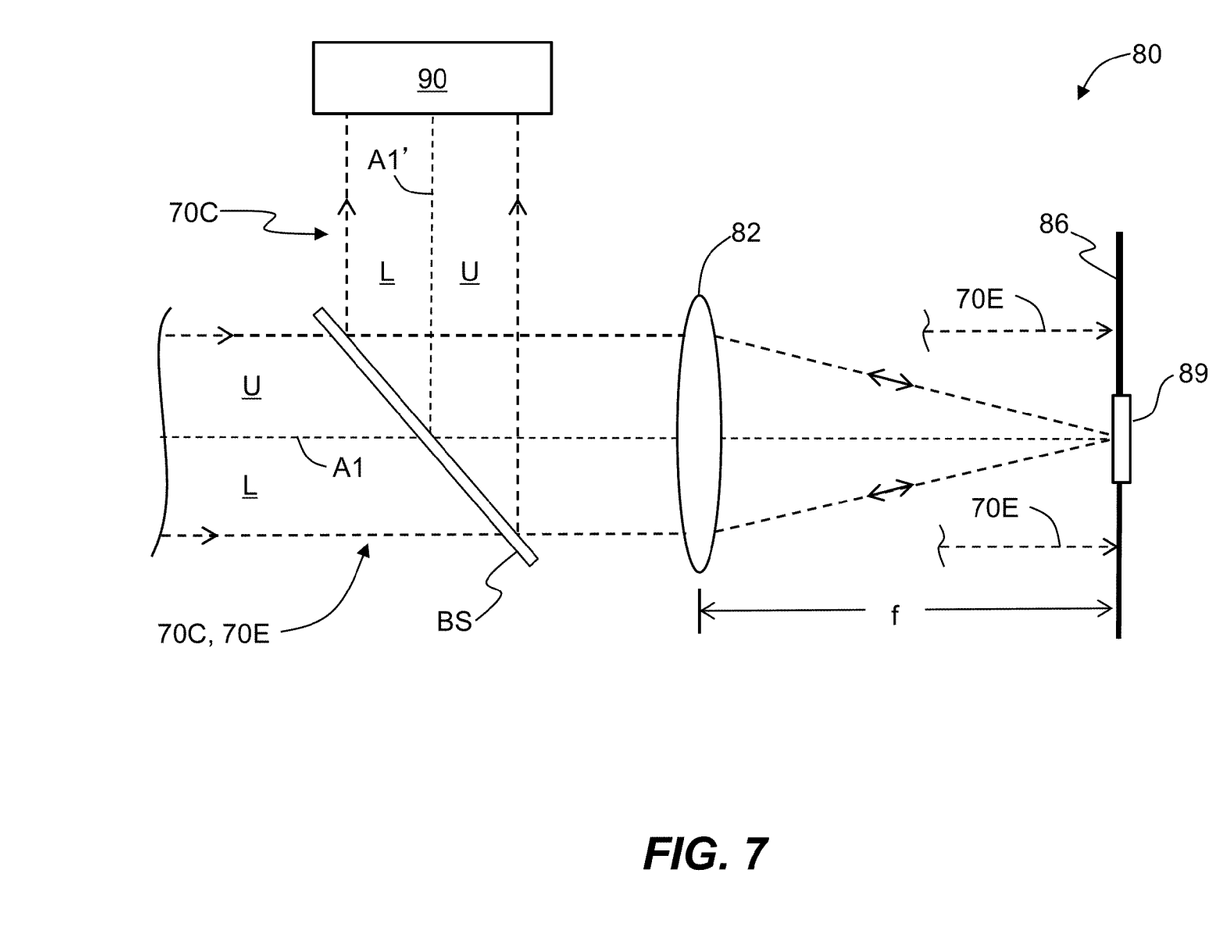
FIG. 7 is an optical diagram similar to FIG. 5 of an example reflective 1× double-telecentric relay optical system that employs a mirror at the aperture stop.

FIG. 7 is similar to FIG. 5 and is a close-up view of an exemplary embodiment of folded relay optical system 80, wherein a mirror 89 is placed at aperture 88 and a beam splitter BS is placed upstream of single lens 82. The mirror 89 serves to fold relay optical system 80 while still blocking extraneous light beams 70E. The reflected combined light beam 70C travels back toward single lens 82 and is incident upon beam splitter BS, which directs a portion (e.g., 50%) of the combined light beam along a folded optical axis A1' and to folding optical system 90. In an example, aperture stop 86 is omitted and the finite size of mirror 89 is used to define the size of the "aperture." The configuration of aperture stop 86 shown in FIG. 7 is referred to herein as a "reflecting" aperture stop because it reflects substantially only combined light beam 70C.

Figure 8A:
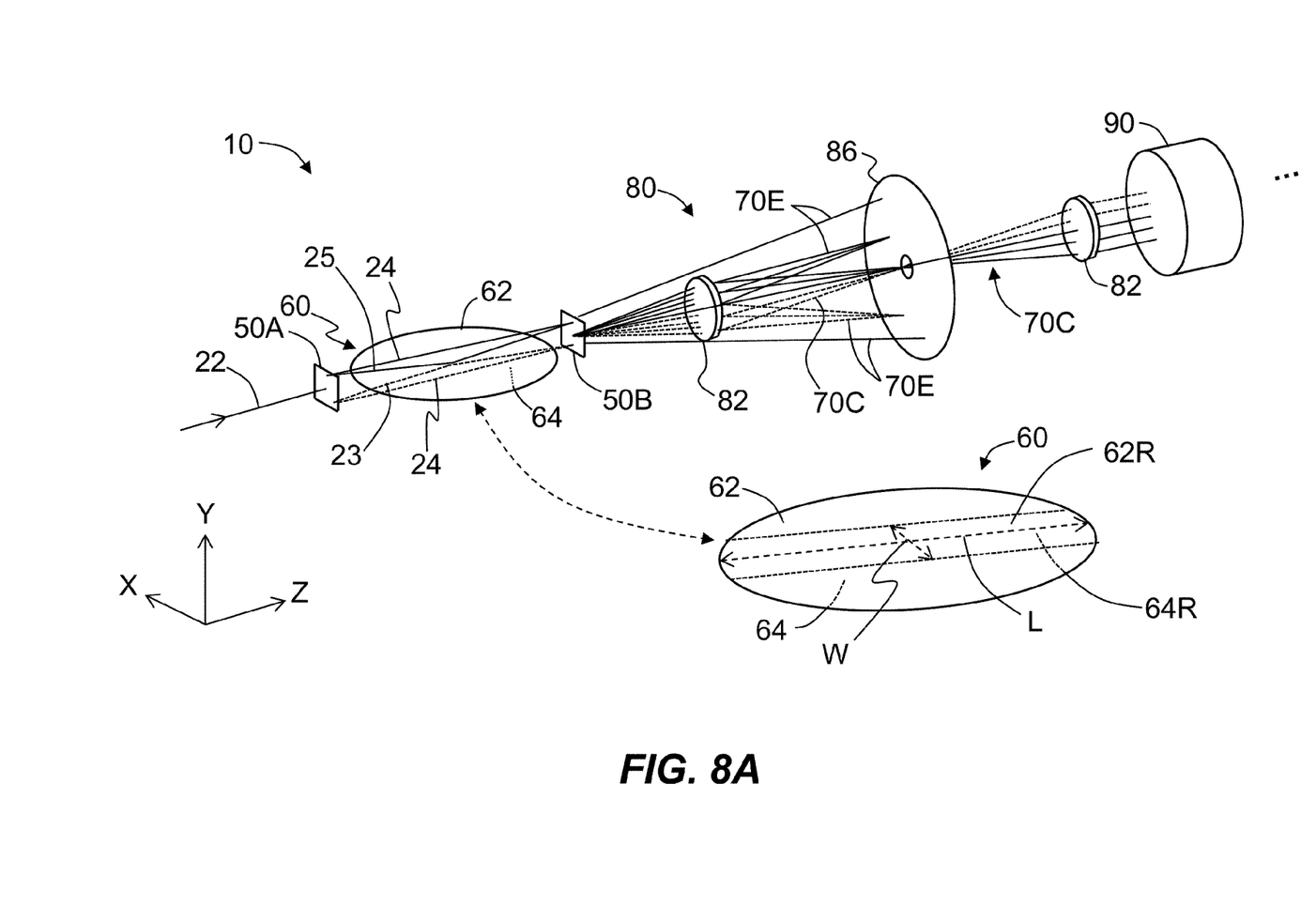
FIG. 8A is an elevated view of a portion of the grazing-incidence interferometer illustrating how respective regions on the upper and lower surfaces of the object are illuminated by the $-1^{st}$ and $+1^{st}$ diffracted orders.

FIG. 8A is an elevated view of a portion of interferometer 10, illustrating an exemplary embodiment wherein respective regions 62R and 64R of upper and lower surfaces 62 and 64 (as denoted by the dashed lines) of width W (as measured in the X-direction) and length L (as measured in the Z-direction) are respectively illuminated by the $-1^{st}$ and $+1^{st}$ diffracted-order light beams 23 and 25. In this embodiment, the respective upper and lower surface regions 62R and 64R are imaged onto screen 110 and then processed by digital camera 120 and processor 130 (see FIG. 1). In an example, the width W of surface regions 62R and 64R is determined by the width of DOEs 50A and 50B and the width of the expanded, collimated light beam 22. The length L is determined by the height (in the Y-direction) of DOEs 50A and 50B and the height of the expanded, collimated light beam 22.

Figure 8B:
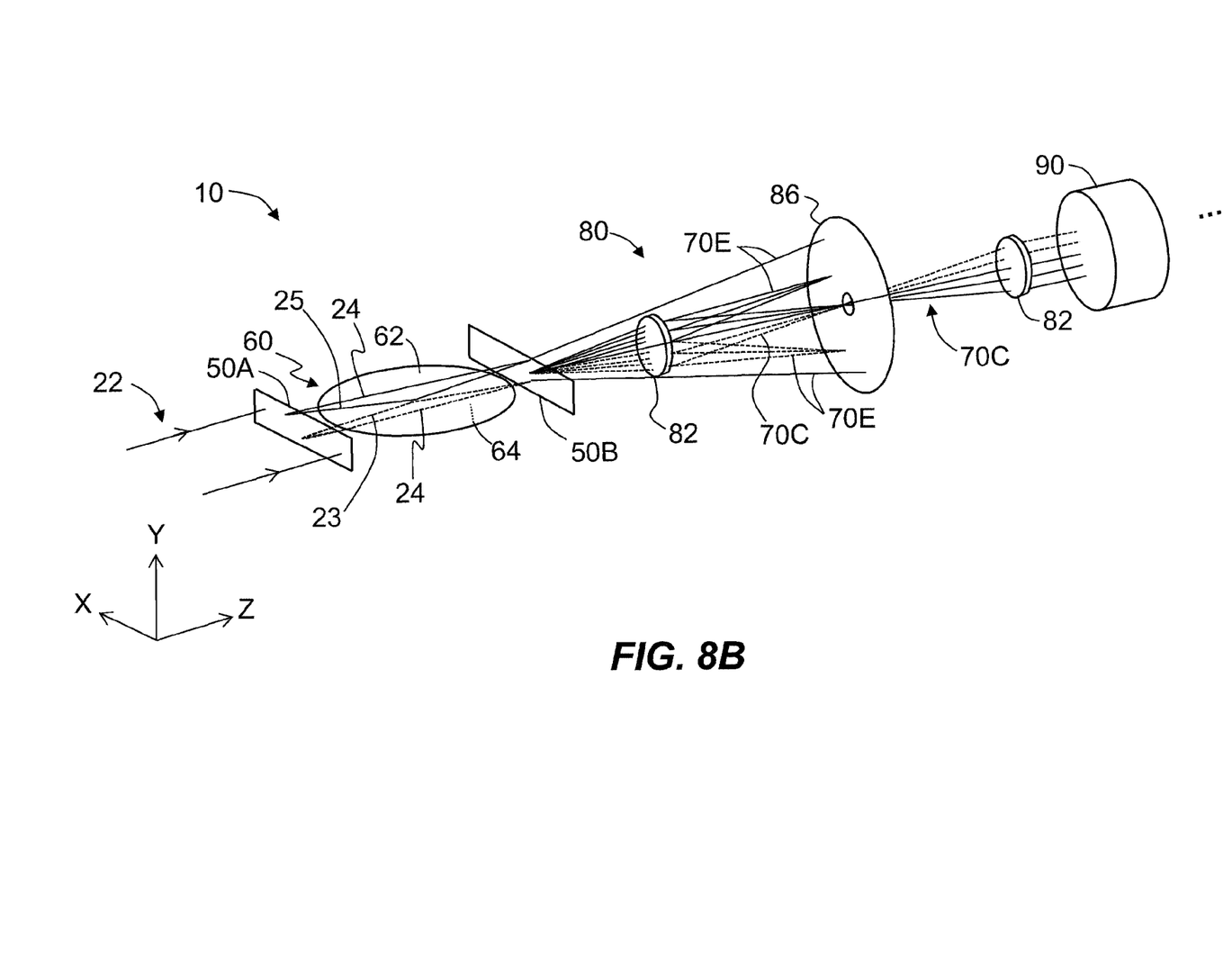
FIG. 8B is similar to FIG. 8A and illustrates an exemplary embodiment wherein the width and height of both the collimated beam and the first and second diffractive optical elements are sized to support illumination of substantially the entire upper and lower surfaces of the object.

It will be desirable in some cases to illuminate and thus image substantially the entire upper and lower surfaces 62 and 64 of object 60. This may be accomplished by configuring interferometer 10 so that first and second DOEs 50A and 50B and collimated light beam 22 are sized to illuminate substantially the entire upper and lower surfaces 62 and 64 of object 60. FIG. 8B is similar to FIG. 8A and illustrates such an exemplary embodiment of interferometer 10 wherein the width and height of both collimated light beam 22 and first and second DOEs 50A and 50B are sized to support illumination of substantially the entire upper and lower surfaces 62 and 64 of object 60. In the embodiment of FIG. 8B, regions 62R and 64R respectively constitute substantially the entire upper and lower surfaces 62 and 64 of object 60.

Figure 8C:
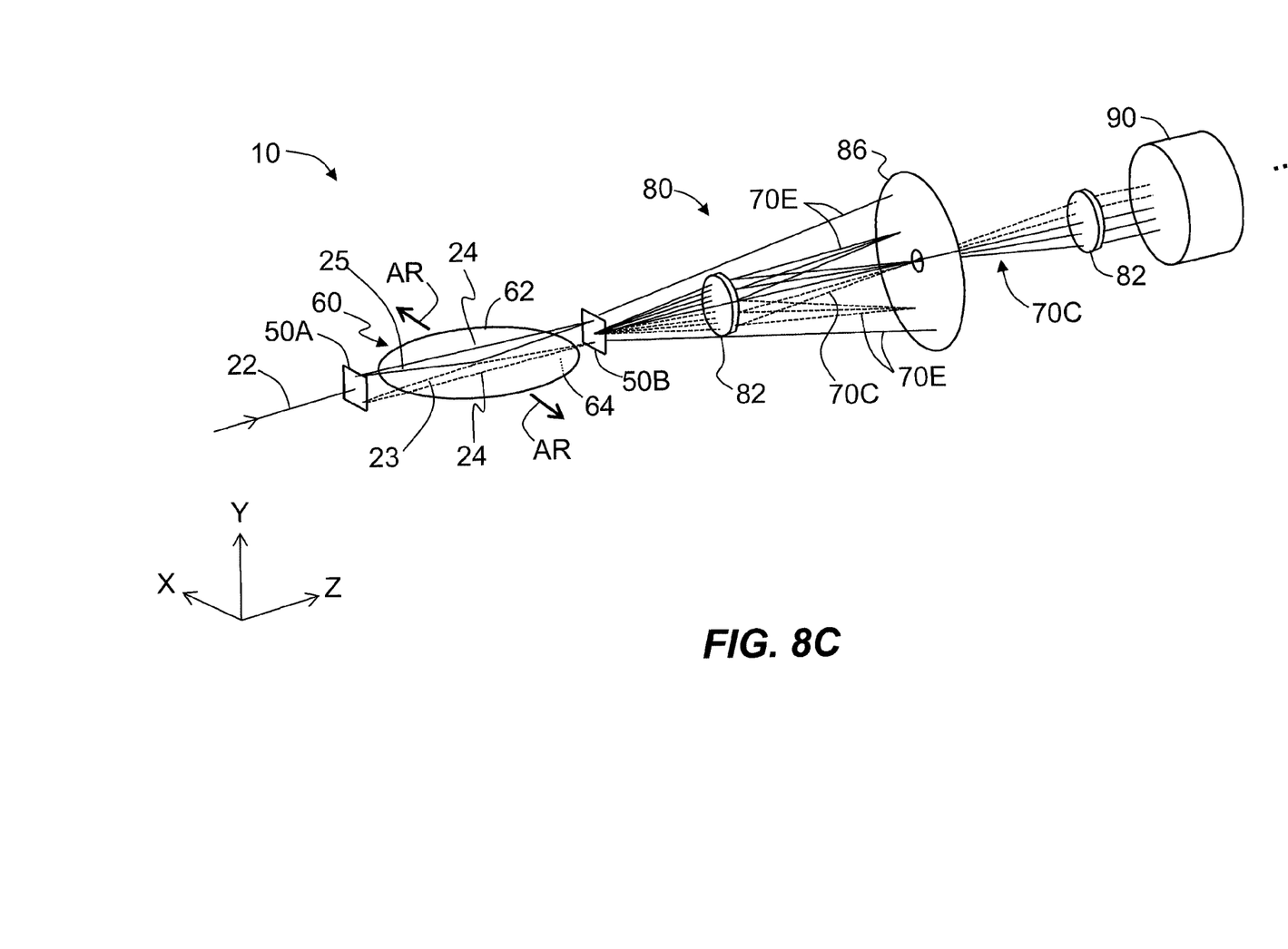
FIG. 8C is similar to FIG. 8A and illustrates an exemplary embodiment wherein the object is translated so that the regions illuminated by the $-1^{st}$ and $+1^{st}$ diffracted orders are scanned.

FIG. 8C is similar to FIG. 8A and shows an exemplary embodiment of interferometer 10 wherein the $-1^{st}$ and $+1^{st}$ diffracted-order light beams 23 and 25 are scanned over upper and lower surfaces 62 and 64 by translating object 60 (as denoted by arrows AR) in the X-Z plane.

Figure 8D:
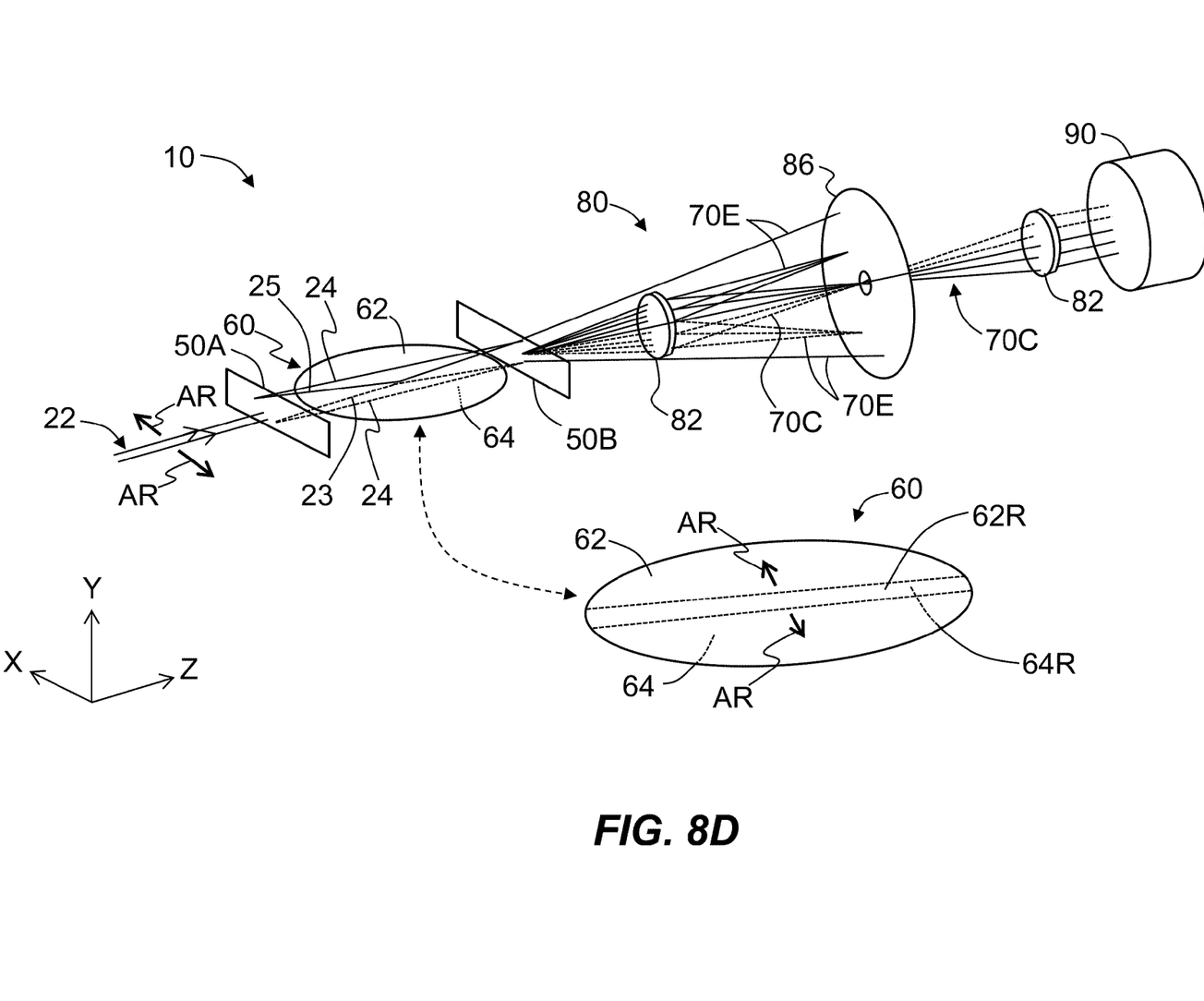
FIG. 8D is similar to FIG. 8B and illustrates an exemplary embodiment wherein the collimated beam is scanned relative to the first diffractive optical element to scan the illuminated regions of the upper and lower surfaces of the object.

FIG. 8D is similar to FIG. 8B and shows an exemplary embodiment of interferometer 10 wherein the $-1^{st}$ and $+1^{st}$ diffracted-order light beams 23 and 25 are respectively scanned over upper and lower surfaces 62 and 64 of object 60 by translating collimated light beam 22 relative to first DOE 50A. The translation of collimated light beam 22 causes a corresponding translation of regions 62R and 64R, thereby effectuating scanning of upper and lower surfaces 62 and 64 of object 60 by respective $-1^{st}$ and $+1^{st}$ diffracted-order light beams 23 and 25.

Figure 8E:
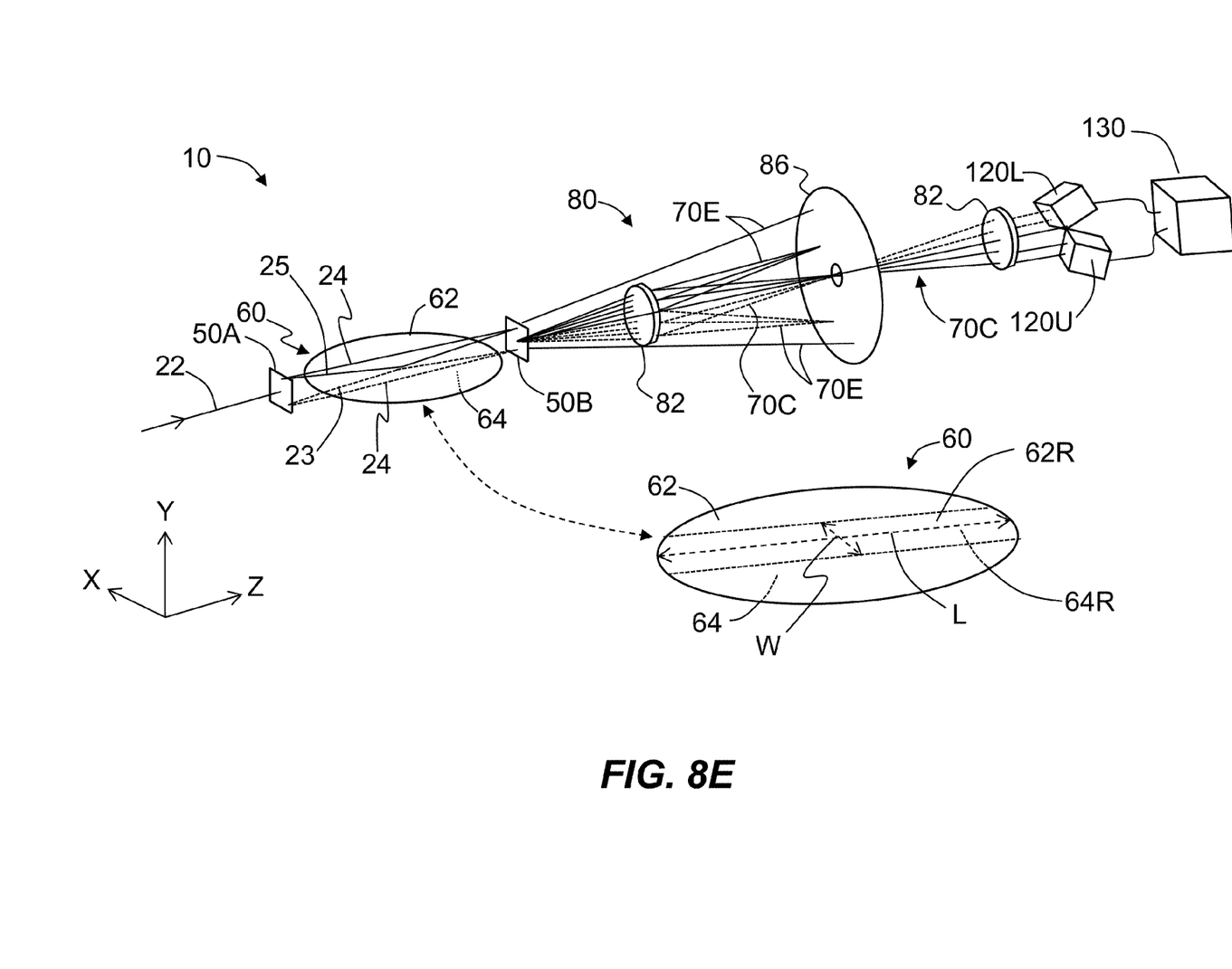
FIG. 8E is similar to FIG. 8A and illustrates an exemplary embodiment wherein two digital cameras are used to directly capture digital interference images of the upper and lower surfaces of the object.

FIG. 8E is similar to FIG. 8A and illustrates an exemplary embodiment wherein two digital cameras 120U and 120L are operably disposed in the tilted image planes $IP_U$ and $IP_L$ (see FIG. 5) to directly capture digital interference images of the upper and lower surfaces 64 and 62, respectively, of object 60. This exemplary embodiment eliminates the need for folding optical system 90 and screen 110 to form the upper and lower interference images IMU and $IM_L$ on a common image plane $IP_C$ (FIG. 6), albeit at the expense of having to add a second digital camera. Digital cameras 120U and 120L are operably connected to processor 130.

An advantage of interferometer 10 is that thickness variation $TH(x,z)$ of object 60 can be determined by simultaneously measuring both upper and lower surfaces 62 and 64 of the object. This provides a more accurate measurement of thickness variation $TH(x,z)$ than is possible by mounting object 60 to a chuck to measure upper surface 62 and then flipping the object over and re-mounting the object to the chuck to measure lower surface 64. This is because the act of mounting object 60 to a chuck causes measurable changes in the surface topography of the object, and such changes translate into thickness variations that are not inherent in the object.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A grazing-incidence interferometer for analyzing opposite surfaces of an object, comprising:
    a first diffractive optical element (DOE) arranged to receive a substantially coherent light beam and form therefrom a zero-diffracted-order light beam and +1 and −1 first-diffracted-order light beams that respectively reflect from the opposite object surfaces at respective [a] grazing-incidence angles while the zero-diffracted-order light beam is unreflected;
    a second DOE arranged to receive and combine the unreflected zero-diffracted-order light beam and the reflected +1 and −1 first-diffracted-order light beams to form a combined light beam that is substantially collimated;
    a 1× double-telecentric relay system having an optical axis co-axial with the combined light beam and an aperture stop sized to transmit or reflect only the combined light beam;
    a folding optical system that receives the combined light beam from the 1× double-telecentric relay system and forms first and second interference images of the first and second object surfaces at a common image plane; and
    a diffusing screen arranged at the common image plane and upon which the first and second interference images are formed.

2. The grazing-incidence interferometer according to claim 1, wherein the +1 and −1 first-diffracted-order light beams respectively illuminate substantially the entire opposite surfaces of the object.

3. The grazing-incidence interferometer according to claim 1, wherein the aperture stop includes either a central aperture that passes the combined light beam or a mirror element that reflects the combined light beam.

4. The grazing-incidence interferometer according to claim 1, wherein the folding optical system consists of four fold mirrors.

5. The grazing-incidence interferometer according to claim 1, further comprising:
    a digital camera having an imaging lens and a digital image sensor, the digital camera being arranged to form on the digital image sensor first and second digital images of the first and second interference images, wherein the digital image sensor forms first and second electrical image signals representative of the first and second digital images; and
    a processor electrically connected to the image sensor and adapted to receive and process the first and second electrical image signals.

6. The grazing-incidence interferometer according to claim 5, wherein the processor includes instructions embodied in a non-transitory computer-readable medium that cause the processor to determine a variation in the thickness of the object based on the first and second electrical image, signals.

7. The grazing-incidence interferometer according to claim 1, wherein the +1 and −1 diffracted-order light beams respectively illuminate first and second scanned regions of the first and second object surfaces.

8. A grazing-incidence interferometer for analyzing opposite first and second surfaces of a generally planar object having a thickness, comprising:
    a light source that generates a substantially coherent light beam;
    first and second spaced-apart diffractive optical elements arranged along an optical axis and downstream of the light source, with the object therebetween, wherein the first and second surfaces defined first and second object planes, and wherein the first diffractive optical element forms $-1^{st}$, zero and $+1^{st}$ diffracted-order light beams, with the $-1^{st}$ and $+1^{st}$ diffracted-order light beams respectively reflecting from the first and second surfaces and combining with the zero-diffracted-order light beam in a sheared manner to form a substantially collimated combined light beam;
    a 1× double-telecentric relay system downstream of the second diffractive optical element and having a transmitting or reflecting aperture stop that transmits or reflects only the collimated combined light beam and that defines first and second image planes at which first and second interference images are respectively formed and which satisfy a Scheimpflug condition with respect to the first and second object planes;
    a folding optical system downstream of the 1× double-telecentric relay system and that combines the first and second interference images from the first and second image planes at a common image plane;
    a diffusing screen that resides in the common image plane and upon which the first and second interference images are formed;
    a digital camera arranged to capture a digital image of the first and second interference images formed on the diffusing screen; and
    a processor electrically connected to the digital camera and configured to process the digital image of the diffusing screen.

9. The grazing-incidence interferometer according to claim 8, wherein the processor includes instructions embodied in a non-transitory computer-readable medium that cause the processor to determine a variation in the thickness of the object based on the first and second electrical image signals.

10. The grazing-incidence interferometer according to claim 8, wherein the +1 and −1 diffracted-order light beams respectively illuminate first and second scanned regions of the first and second object surfaces.

11. A method of performing grazing-incidence interferometry of an object having first and second opposite surfaces, comprising:
    forming from a substantially coherent wavefront a zero-diffracted-order light beam and +1 and −1 first-diffracted-order light beams;
    respectively reflecting the +1 and −1 first-diffracted-order light beams from the object first and second surfaces of the object while leaving the zero-diffracted-order light beam unreflected;
    combining the reflected +1 and −1 first-diffracted-order light beams with the unreflected zero-diffracted-order light beam in a sheared manner to form a combined light beam that is substantially collimated;

relaying the collimated combined light beam through a 1× double-telecentric relay having an aperture stop that passes or reflects substantially only the combined light beam to form first and second interference images at first and second image planes which respectively satisfy a Scheimpflug condition with respect to the first and second opposite surfaces of the object;

using a folding optical system, combining the first and second interference images formed at the first and second image planes onto a common image plane;

disposing a diffusing screen at the common image plane to form the first and second interference images on the diffusing screen; and capturing a digital image of the first and second interference images as formed on the diffusing screen.

12. The method according to claim 11, further comprising moving the object in a manner that changes a phase of the reflected +1 and −1 first-diffracted-order light beams.

13. The method according to claim 11, further including processing the digital image of the first and second interference images to determine a thickness variation of the object.

14. The method according to claim 11, wherein the +1 and −1 diffracted-order light beams are respectively scanned over the first and second object surfaces.

15. The method according to claim 11, further comprising subtracting a perfect reference from the first and second interference images to at least partially compensate for a wavefront error.

* * * * *